(12) United States Patent
Walker (10) Patent No.: US 8,737,292 B2
(45) Date of Patent: May 27, 2014

(54) FREQUENCY OFFSET ESTIMATION IN A CDMA SYSTEM

(75) Inventor: Simon Nicholas Walker, Berkshire (GB)

(73) Assignee: ICERA, Inc., Wilmington, DE (US)

( * ) Notice: Subject to any disclaimer, the term of this patent is extended or adjusted under 35 U.S.C. 154(b) by 382 days.

(21) Appl. No.: 12/741,796

(22) PCT Filed: Oct. 24, 2008

(86) PCT No.: PCT/EP2008/064473
§ 371 (c)(1),
(2), (4) Date: Jun. 15, 2010

(87) PCT Pub. No.: WO2009/059907
PCT Pub. Date: May 14, 2009

(65) Prior Publication Data
US 2011/0007644 A1    Jan. 13, 2011

(30) Foreign Application Priority Data
Nov. 6, 2007  (GB) ................................... 0721758.1

(51) Int. Cl.
| H04B 7/212 | (2006.01) |
| H04W 56/00 | (2009.01) |
| H04J 3/06 | (2006.01) |

(52) U.S. Cl.
CPC ............. H04B 7/2125 (2013.01); H04W 56/00 (2013.01); H04J 3/0685 (2013.01)
USPC ...... 370/324; 370/350; 370/395.62; 370/503; 455/502; 375/272

(58) Field of Classification Search
CPC ..................................................... H04B 7/2125
USPC ............ 370/304, 324, 350, 395.62, 503, 507, 370/509–514, 520; 455/502; 375/272, 554
See application file for complete search history.

(56) References Cited

U.S. PATENT DOCUMENTS

| 6,067,314 A | 5/2000 | Azuma |
| 7,177,265 B1 | 2/2007 | Schaffner |
| 2005/0186924 A1 | 8/2005 | Hur |

FOREIGN PATENT DOCUMENTS

| EP | 1035665 A1 * | 9/2000 |
| JP | 1028076 A | 1/1998 |

(Continued)

OTHER PUBLICATIONS

Moon et al., Cell Search to Initial Frequency Offset in WCDMA Systems, IEEE 2002.*

(Continued)

*Primary Examiner* — Mark Rinehart
*Assistant Examiner* — Mang Yeung (57) ABSTRACT

The present invention provides a method of estimating a frequency offset. The method comprises receiving a wireless signal timed according to a first frequency; generating a local signal timed according to a second frequency; and performing a plurality of synchronization searches, each search comprising obtaining a set of correlation results indicative of a correlation between the wireless signal and the local signal at different timing offsets of the wireless signal relative to the local signal. The method the no comprises finding a series of results, with a result from each of a plurality of the synchronization searches, for which the difference in; timing offset between results from adjacent searches in the series is within a maximum specified value. A frequency off set between the first and second frequencies can be determined from the series.

20 Claims, 5 Drawing Sheets

| Synchronisation search no. n = 1…N |||||||
|---|---|---|---|---|---|---|
| $t_{11}$ $Z_{11}$ | $t_{21}$ $Z_{21}$ | $t_{31}=t_{12}+2\delta$ $Z_{31}$ | … | … | … | $t_{N1}$ $Z_{N1}$ |
| $t_{12}$ $Z_{12}$ | $t_{22}$ $Z_{22}$ | $t_{32}$ $Z_{32}$ | | | | $t_{N2}$ $Z_{N2}$ |
| $t_{13}$ $Z_{13}$ | $t_{23}=t_{12}+\delta$ $Z_{23}$ | $t_{33}$ $Z_{33}$ | | | | $t_{N3}$ $Z_{N3}$ |
| … | | | … | | | |
| … | | | | … | | $t_{Nm}=t_{12}+(N-1)\delta$ |
| … | | | | $t_{nm}=t_{12}+(n-1)\delta$ | … | |
| $t_{1M}$ $Z_{1M}$ | $t_{2M}$ $Z_{2M}$ | $t_{3M}$ $Z_{3M}$ | | | | $t_{NM}$ $Z_{NM}$ |

(56) References Cited

FOREIGN PATENT DOCUMENTS

| JP | 2002118498 A | 4/2002 |
|----|--------------|--------|
| JP | 2003506918 A | 2/2003 |
| WO | 0110065 A1 | 2/2001 |
| WO | 2006099532 A2 | 9/2006 |
| WO | 200905997 A1 | 5/2009 |

OTHER PUBLICATIONS

Obote, S., et al., "Timing Acquisition Technique of Adaptive Array Antenna Employing Sequential Correlation Coefficient Calculation and Maximum Likelihood Frequency Offset Compensation," The Institute of Electronics, Information and Communication Engineers Research Report, vol. 104, No. 122, Jun. 10, 2004, pp. 25-30.

Saito, K. et al., "A Study of Frequency Offset estimation Method on Digital Mobile Radio," Collected Essays from the Institute of Electronics, Information and Communication Engineers General Conference, 1996, Correspondence 1, Mar. 11, 1996, p. 453, B-453.

Foreign Communication From a Related Counterpart Application, Japanese Application No. 2010-531501, Japanese Office Action dated Apr. 2, 2013.

\* cited by examiner

| Synchronisation search no. n = 1...N ||||||||
|---|---|---|---|---|---|---|
| $t_{11}$ $Z_{11}$ | $t_{21}$ $Z_{21}$ | $t_{31}$ $Z_{31}$ | ... | ... | ... | $t_{N1}$ $Z_{N1}$ |
| $t_{12}$ $Z_{12}$ | $t_{22}$ $Z_{22}$ | $t_{32}$ $Z_{32}$ | | | | $t_{N2}$ $Z_{N2}$ |
| $t_{13}$ $Z_{13}$ | $t_{23}$ $Z_{23}$ | $t_{33}$ $Z_{33}$ | | | | $t_{N3}$ $Z_{N3}$ |
| ... | | | ... | | | |
| ... | | | | ... | | |
| ... | | | | | ... | |
| $t_{1M}$ $Z_{1M}$ | $t_{2M}$ $Z_{2M}$ | $t_{3M}$ $Z_{3M}$ | | | | $t_{NM}$ $Z_{NM}$ |

Figure 5b

| Synchronisation search no. n = 1...N ||||||||
|---|---|---|---|---|---|---|
| $t_{11}$ $Z_{11}$ | $t_{21}=t_{11}+\delta$ $Z_{21}$ | $t_{31}=t_{11}+2\delta$ $Z_{31}$ | ... | ... | ... | $t_{N1}=t_{11}+(N-1)\delta$ $Z_{N1}$ |
| $t_{12}$ $Z_{12}$ | $t_{22}$ $Z_{22}$ | $t_{32}$ $Z_{32}$ | | | | $t_{N2}$ $Z_{N2}$ |
| $t_{13}$ $Z_{13}$ | $t_{23}$ $Z_{23}$ | $t_{33}$ $Z_{33}$ | | | | $t_{N3}$ $Z_{N3}$ |
| ... | | | ... | | | |
| ... | | | | ... | | |
| ... | | | | | ... | |
| $t_{1M}$ $Z_{1M}$ | $t_{2M}$ $Z_{2M}$ | $t_{3M}$ $Z_{3M}$ | | | | $t_{NM}$ $Z_{NM}$ |

Figure 5c

| Synchronisation search no. n = 1...N | | | | | | |
|---|---|---|---|---|---|---|
| $t_{11}$ $Z_{11}$ | $t_{21}$ $Z_{21}$ | $t_{31}=t_{12}+2\delta$ $Z_{31}$ | ... | ... | ... | $t_{N1}$ $Z_{N1}$ |
| $t_{12}$ $Z_{12}$ | $t_{22}$ $Z_{22}$ | $t_{32}$ $Z_{32}$ | | | | $t_{N2}$ $Z_{N2}$ |
| $t_{13}$ $Z_{13}$ | $t_{23}=t_{12}+\delta$ $Z_{23}$ | $t_{33}$ $Z_{33}$ | | | | $t_{N3}$ $Z_{N3}$ |
| ... | | | ... | | | |
| ... | | | | ... | | $t_{Nm}=t_{12}+(N-1)\delta$ |
| ... | | | | $t_{nm}=t_{12}+(n-1)\delta$ | ... | |
| $t_{1M}$ $Z_{1M}$ | $t_{2M}$ $Z_{2M}$ | $t_{3M}$ $Z_{3M}$ | | | | $t_{NM}$ $Z_{NM}$ |

FREQUENCY OFFSET ESTIMATION IN A CDMA SYSTEM

CROSS REFERENCE TO RELATED APPLICATION

This application is the National Stage of, and therefore claims the benefit of International Application No. PCT/EP2008/064473 filed on Oct. 24, 2008, entitled "FREQUENCY OFFSET ESTIMATION IN A CDMA SYSTEM," which was published in English under International Publication Number WO 2009/059907 on May 14, 2009, and has priority based on GB 0721758.1 filed on Nov. 6, 2007. Each of the above applications is commonly assigned with this National Stage application and is incorporated herein by reference in their entirety.

TECHNICAL FIELD

The present invention relates to the estimation of a frequency offset in a received wireless signal, particularly but not exclusively for the purpose of synchronization in a cell search of a cellular mobile communication system such as a Wideband Code Division Multiple Access (W-CDMA) system.

BACKGROUND

In order for a wireless receiver to be able to acquire meaningful data from a transmitter, it is necessary for the receiver to be properly synchronized with the received signal. That is to say, the receiver must sample the data at the correct timing with respect to the received signal. To achieve this, the transmitter must broadcast some kind of synchronization signal whose form is known to the receiver, and which the receiver can use as a reference to determine the timing of the received data.

For example, to acquire a signal in a W-CDMA system, the receiver synchronizes to three broadcast channels, the Primary Synchronization Channel (P-SCH), the Secondary Synchronization Channel (S-SCH) and the Common Pilot Channel (CPICH). For the initial cell search, a primary synchronization is first performed using the P-SCH to provide information on the slot timing, and then a secondary synchronization is performed using the S-SCH to provide information on the code group and frame boundary (i.e. slot position within a frame, or frame boundary acquisition).

One method for performing a synchronization search is discussed in a paper titled "Cell Search Robust to Initial Frequency Offset in WCDMA Systems" (June Moon and Yong-Hwan Lee, School of Electrical Engineering, Seoul National University; from the 13th IEEE International Symposium on Personal, Indoor and Mobile Radio Communications, 2002; ISBN: 0-7803-7589-0). Summarized briefly, this involves correlating the received P-SCH with a locally generated version of the P-SCH code using a matched filter, then averaging the results over a number of time slots using a coherent combing scheme before performing a peak detection followed by the secondary synchronization.

Figure 1:
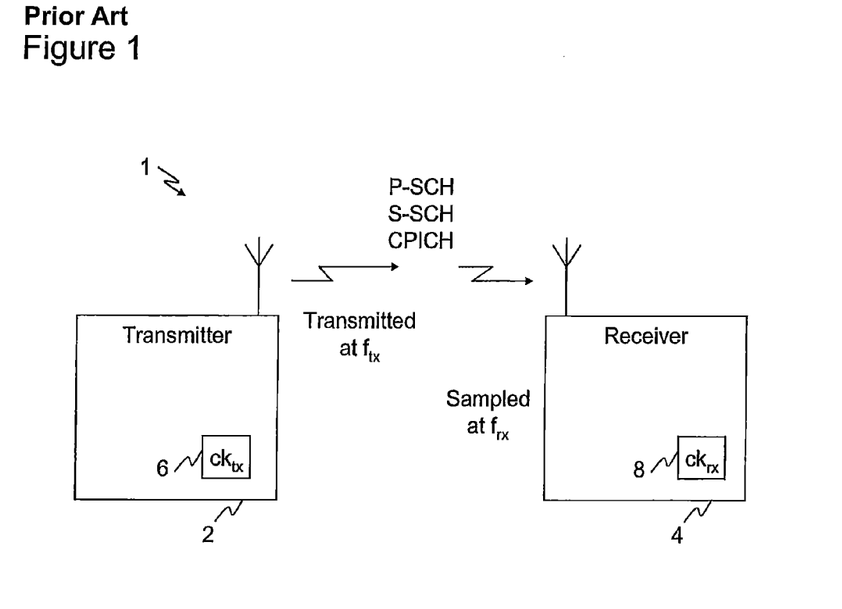
FIG. 1 is a schematic representation of a communication system.

A difficulty with synchronization is discussed in relation to FIG. 1, which illustrates schematically a wireless communication system 1 comprising a transmitter 2 having a first clock ($ck_{tx}$) 6 and a receiver 4 having a second clock ($ck_{rx}$) 8. For example, the transmitter may be a base station of a cellular W-CDMA network and the receiver 4 may be a mobile terminal.

The transmitter 2 transmits data to the receiver 4 at a first frequency $f_{tx}$ dependent on the first clock ($ck_{tx}$) 6, including the P-SCH, S-SCH and CPICH. The receiver 4 samples the data at a second frequency $f_{rx}$ dependent on the second clock ($ck_{rx}$) 8. The first frequency $f_{tx}$ and second frequency $f_{rx}$ are nominally the same. However, in reality no two clocks can ever be completely identical, for example due to manufacturing differences. Therefore the second clock ($ck_{rx}$) 8 will in practice be slightly (but not necessarily negligibly) different from the first clock ($ck_{tx}$) 6, resulting in a frequency offset $f_0$ such that $f_{rx}$ actually equals $f_{tx}+f_0$. In the case where the receiver is a mobile terminal such as a mobile phone, the frequency error is likely to be particularly significant because the crystal oscillators used in the clocks 8 of such consumer devices tend to be cheaper and therefore more prone to error and manufacturing spread.

Because of the nature of the received data, any frequency difference $f_0$ between the transmitter frequency $f_{tx}$ and the receiver frequency $f_{rx}$ will be seen as an ordinary stationary data vector spinning around the origin, i.e. multiplied by a factor $e^{j\phi t}$ where $\phi$ is dependent on the frequency error $f_0$.

Moon & Lee describe a synchronization method which is more robust against such frequency errors due to an improved, coherent combining scheme. However, one point which is overlooked by the above Moon & Lee reference is that there will be a time shift because of the receiver sampling clock 8 being different from the transmitter clock 6. That is, because data is sampled at a slightly different rate than it is transmitted, the sampling shift will be perceived as a constant movement in time of the data, or a sliding of the received data relative to the transmitted data.

After attempting primary synchronization for example, the secondary synchronization may fail, because the data is not where it is expected to be and so the correlation values returned may be very poor. The degree of averaging and hence the accuracy of the estimation is therefore also determined by the time drift. In practice, to reliably detect a P-SCH at the cell edge limits the allowable frequency error using current techniques is between 1 kHz and 2 kHz depending on implementation. This degree of frequency correction is usually termed fine AFC (automatic frequency control).

Coarse AFC, for correction of frequency errors greater than this, would typically involve trial and error searches with the receiver clock adjusted in incremental amounts for each search. This is a slow process.

It would be advantageous to provide a fast and accurate method of frequency error estimation. It would also be advantageous to be able to cope with larger frequency errors. Particularly, in a case where the receiver 4 is a mobile consumer device such as a mobile phone, it would be preferable to be able to use a cheaper oscillator for the clock 8.

SUMMARY

According to one aspect of the present invention, there is provided a method of estimating a frequency offset, the method comprising: receiving a wireless signal timed according to a first frequency; generating a local signal timed according to a second frequency; performing a plurality of synchronization searches, each search comprising obtaining a set of correlation results indicative of a correlation between the wireless signal and the local signal at different timing offsets of the wireless signal relative to the local signal; finding a series of results, with a result from each of a plurality of said synchronization searches, for which the difference in timing offset between results from adjacent searches in the series is within a maximum specified value; and determining from said series a frequency offset between the first and second frequencies.

This solution advantageously provides a faster and more accurate method of frequency error estimation than existing techniques. The solution is also cheaper because it is easy to implement in code, and because it accommodates larger frequency errors allowing cheaper oscillator crystals.

In embodiments the method may comprise, for each synchronization search, ordering the respective correlation results in order of a corresponding received signal energy. This improves the efficiency of the estimate by allowing the results to be prioritized according to signal energy.

In further embodiments, said step of finding of said series may be performed using only a top portion of the correlation results having the greatest received signal energy from each synchronization search. Thus the efficiency may be further improved by ignoring certain low energy results altogether.

In further embodiments, the step of determining the frequency offset may comprise determining the frequency offset from a difference in timing offsets between at least two of the correlation results from different searches in said series. The step of determining the frequency offset may comprise determining a phase from sums of real and imaginary parts of the correlation results in said series. The latter is preferred because the accuracy of the estimation is not as strongly affected by the time interval between the synchronization searches.

In further embodiments, the step of determining the frequency offset may be conditional on a magnitude of a sum of real and imaginary parts of the correlation results in said series being above a predetermined threshold. This advantageously allows results to be thresholded to reduce the likelihood of false alarms.

In yet further embodiments, the method may comprise using said estimation to correct for the frequency offset. The step of receiving the wireless signal may comprise receiving a synchronization channel on which is broadcast a synchronization code, and the step of generating the local signal comprises generating a local version of the synchronization code. The synchronisation channel may be a primary synchronisation channel of a W-CDMA cellular communications system. The present invention is particularly effective and applicable in such contexts.

According to another aspect of the present invention, there is provided a wireless receiver, comprising: reception means arranged to receive a wireless signal timed according to a first frequency; generation means arranged to generate a local signal timed according to a second frequency; correlation means arranged to perform a plurality of synchronisation searches, each search comprising obtaining a set of correlation results indicative of a correlation between the wireless signal and the local signal at different timing offsets of the wireless signal relative to the local signal; and frequency offset estimation means arranged to find a series of results, with a result from each of a plurality of said synchronisation searches, for which the difference in timing offset between results from adjacent searches in the series is within a maximum specified value, and to estimate from said series a frequency offset between the first and second frequencies.

According to another aspect of the present invention, there is provided a computer program product for estimating frequency offset between a received wireless signal timed according to a first frequency and a generated local signal timed according to a second frequency, the program comprising code which when executed by a processor is configured to perform the steps of: performing a plurality of synchronisation searches, each search comprising obtaining a set of correlation results indicative of a correlation between the wireless signal and the local signal at different timing offsets of the wireless signal relative to the local signal; finding a series of results, with a result from each of a plurality of said synchronisation searches, for which the difference in timing offset between results from adjacent searches in the series is within a maximum specified value; and determining the frequency offset from said series.

According to another aspect of the present invention, there is provided a wireless cellular communication system comprising: a base station arranged to transmit a wireless signal timed according to a first frequency, and a mobile terminal comprising: reception means arranged to receive said wireless signal; generation means arranged to generate a local signal timed according to a second frequency; correlation means arranged to perform a plurality of synchronisation searches, each search comprising obtaining a set of correlation results indicative of a correlation between the wireless signal and the local signal at different timing offsets of the wireless signal relative to the local signal; and frequency offset estimation means arranged to find a series of results, with a result from each of a plurality of said synchronisation searches, for which the difference in timing offset between results from adjacent searches in the series is within a maximum specified value, and to estimate from said series a frequency offset between the first and second frequencies.

For a better understanding of the present invention and to show how the same may be carried into effect, reference will now be made by way of example to the accompanying drawings.

BRIEF DESCRIPTION

Reference is now made to the following descriptions taken in conjunction with the accompanying drawings, in which.

DETAILED DESCRIPTION

Figure 2:
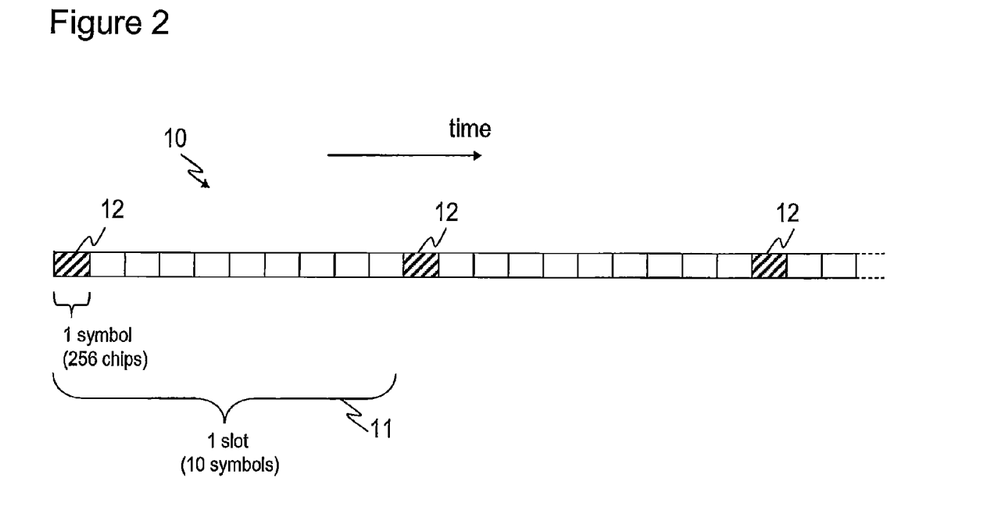
FIG. 2 is a schematic representation of a control channel.

Those skilled in the art to which this application relates will appreciate that other and further additions, deletions, substitutions and modifications may be made to the described embodiments. FIG. 2 illustrates a Primary Common Physical Control Channel (P-CCPCH) 10 of a W-CDMA system. The P-CCPCH comprises a plurality of sequentially transmitted time slots 11, each slot 11 being ten symbols long and each symbol being 256 chips long. As shown, the first symbol in every ten is used to transmit the Primary Synchronisation Channel (P-SCH) 12 in the form of a 256-chip primary synchronisation code. The receiver 4 also has a locally generated version of the primary synchronisation code 12, which it uses to acquire the initial slot timing by correlating the local version of the code with the received signal 10.

As already mentioned, one method for performing such a synchronisation search is discussed in the paper "Cell Search Robust to Initial Frequency Offset in WCDMA Systems" (Moon & Lee), as referenced above. The method is outlined here for completeness, but it will be appreciated that the skilled person will be familiar with this and other methods of performing a synchronisation search. The particular method chosen is not of crucial importance, and the principal of the present invention can be extended to different methods of synchronisation. The main point is that the search results in a set of measurements indicative of a correlation between the received signal and the local code at a range of different timing offsets of the received signal relative to the local code.

Figure 3:
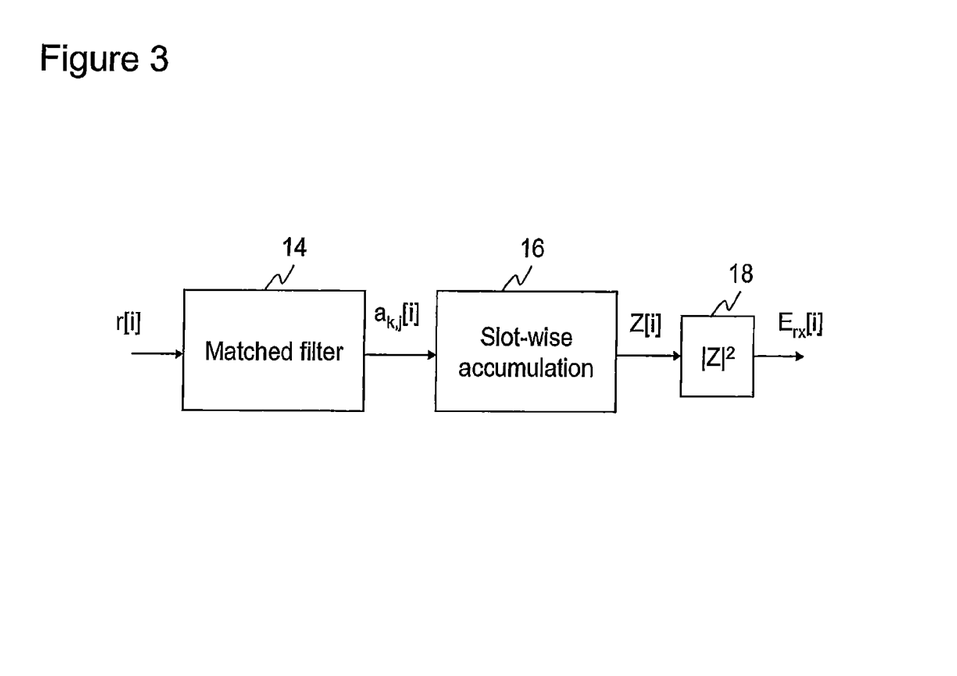
FIG. 3 is schematic block diagram of some synchronisation functions.

FIG. 3 is a schematic block diagram showing some of the functions of the receiver 4 involved in the primary synchronisation. These include a matched filter 14, an accumulator 16, and a magnitude block 18. The matched filter 14 is arranged to receive an input from a receive front-end (not shown) and to provide an output to the accumulator 16. The accumulator 16 is arranged to receive the output from the matched filter 14 and to provide an output to the magnitude block 18. The magnitude block is arranged to receive the output from the accumulator 16 and to provide an output to further stages of the receiver 4 including a peak detection function (not shown).

In embodiments, the receiver 4 is a software modem, or "soft modem", whereby at least some of the signal processing is implemented in software running on a generic, programmable processor. Preferably, the software modem is a soft baseband modem. That is, on the receive side, all the radio functionality from receiving RF signals from the antenna up to and including mixing down to baseband is implemented in dedicated hardware. But all functionality in the baseband domain is implemented in software stored on a memory of the receiver 4 and executed by the receiver's processor (neither shown).

Thus, each of the matched filter 14, accumulator 16, and magnitude block 18 preferably comprises a portion of code stored in memory and executed by the processor.

In operation, reception of signals begins with down converting, low pass filtering and sampling at time $t=iT_c$ in the receive front-end (not shown). $T_c$ is the chip time period and i is the chip index. The index i is a measure of the time offset from the beginning of the slot, measured in chips. The matched filter 14 then receives signal samples r[i] as its input from the receive front-end. The samples r[i] can be represented by:

$$r[i]=\sqrt{E_{tx}[i]/2}\alpha[i]e^{j\theta[i]}C_{PSCH}[i-k]+n[i]$$

where $E_{tx}[i]$ is the transmitted energy of the P-SCH code; $\alpha[i]$ represents the variation in gain due to channel fading; $\theta[i]$ represents the phase distortion due to channel and RF carrier offset; $C_{P-SCH}[i]$ is the P-SCH code; $kT_c$ is the delay due to the channel and receiver filtering; and n[i] is the noise term including intra-cell interference, inter-cell interference and thermal noise. Because the P-SCH code is transmitted in the first symbol (256 chips) of a ten-symbol slot (2560 chips), the transmitted $E_{tx}$ can be represented by:

$$E_{tx}[i]=\begin{cases} E, & 0 \le i < 256 \\ 0, & 256 \le i < 2560 \end{cases}$$

And the P-SCH code can be generated using two codes $X_1$ and $X_2$ of length sixteen, such that:

$$C_{P-SCH}[i]=(i+j)X_1[i(\text{div})16]X_2[i(\text{mod})16]$$

where:
$X_1=[1,1,1,-1,-1,1,-1,-1,1,1,1,1,-1,1,-1,1,1];$
$X_2=[1,1,1,1,1,1,-1,-1,1,-1,1,1,-1,1,-1,-1,1,1];$
and i(div)16 is the quotient of i/16 and i(mod)16 is the remainder of i/16.

The matched filter 14 outputs a plurality of partial correlation values $a_{k,j}[i]$ for each time index i, where j=1 . . . 4 and k is the slot index of the $k^{th}$ slot. These partial correlation values are a measure of the correlation between the received signal 10 and a locally generated reference signal (i.e. the locally generated version of the P-SCH code) at each of the i=0 . . . 2559 possible timing offsets between the local and received signals, for each quarter j of each slot k. The partial correlation values can be represented as:

$$a_{k,j}[i] = \frac{1}{64}\sum_{l=64j}^{64(j+1)-1} r[i+l]X_1[l(\text{div})16]X_2[l(\text{mod})16] + \eta[i]$$

where η[i] is the interference due to the correlation of n[i] and $C_{P-SCH}[i]$ The accumulator 16 receives the partial correlation values $a_{k,j}[i]$ output from the matched filter 14, and combines the results for each chip index i over the j=1 . . . 4 quarters and k slots, thus producing a plurality of correlation results Z[i]. The accumulation is preferably according to a coherent combining scheme, whereby the correlation results are found as follows:

$$Z[i] = \sum_{k=0}^{K-1} \sum_{j=0}^{2} a_{k,j}^*[i] \cdot a_{k,j+1}[i]$$

where K is the total number of slots under consideration, preferably equal to sixteen. So for each slot k, the accumulator 16 takes the complex conjugate of the first partial correlation value $a_{k,0}[i]$ and multiplies it by the second partial correlation value $a_{k,1}[i]$, takes the complex conjugate of the second partial correlation value $a_{k,1}[i]$ and multiplies it by the third partial correlation value $a_{k,2}[i]$, and takes the complex conjugate of the third partial correlation value $a_{k,2}[i]$ and multiplies it by the fourth partial correlation value $a_{k,3}[i]$. The accumulator 16 then sums each these multiples over each of the slots k, resulting in a correlation result Z[i] for each of the i=0 . . . 2559 timing offsets between the received signal and the locally generated P-SCH code signal.

The magnitude block 18 receives the correlation results Z[i] output by the accumulator 16, and takes the modulus squared of each to produce a measure $E_{rx}[i]$ of the received P-SCH energy corresponding to the i=0 . . . 2559 different timing offsets of the received signal relative to the locally generated P-SCH code signal:

$$E_{rx}[i] \propto |Z[i]|^2$$

In fact, in a preferred embodiment, the measurement described above is performed at twice the chip rate rather than once per chip, thus resulting in 5120 results. That is, $t=\frac{1}{2}iT_c$ so that the chip index i is actually a measure of the number of half chips' timing offset.

Figure 4A:
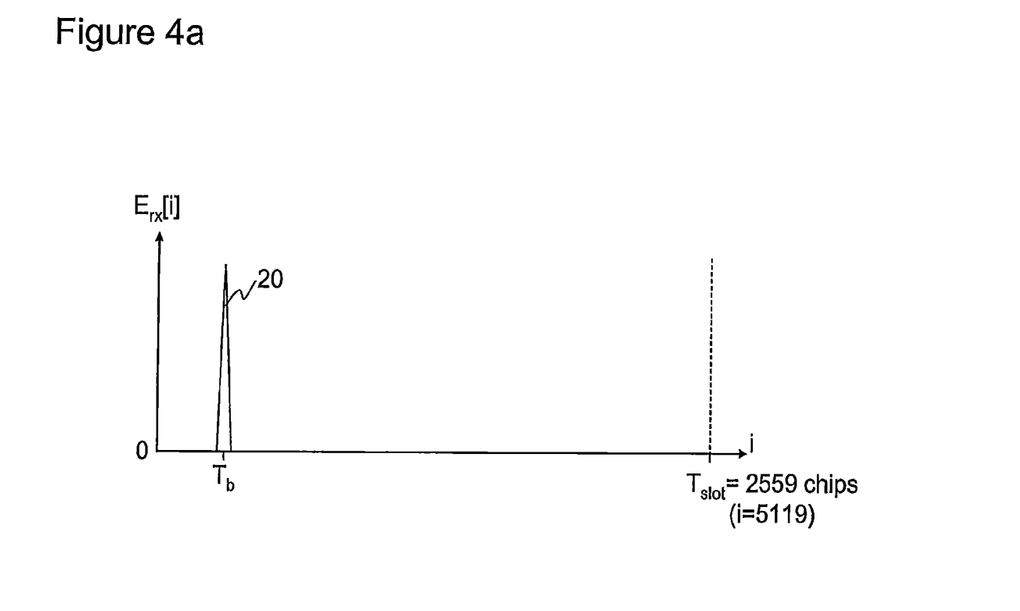
FIG. 4a shows an idealized output of the functions of FIG. 3.

As illustrated schematically in FIG. 4a, in an ideal case the measurement $E_{rx}[i]$ produces a narrow spike 20 around the chip timing index at which the timing of the P-SCH code 12 in the received signal is exactly aligned in time with the timing of the locally generated P-SCH code (note that the width of the peak 20 is not necessarily to scale). Thus it is possible by peak detection to determine the slot timing chip index, i.e. to locate the beginning of the slot $T_b$.

Moon & Lee also describe how the frequency error $f_0$ can be determined based on the above calculations. However, Moon & Lee's method ignores the associated sampling drift, which will be perceived as a constant movement in time of the sampled data, or a sliding of the received data relative to the transmitted data. It would be desirable to correct for this effect, and particularly before moving on to the secondary synchronisation. Accordingly, an embodiment of the present invention is now described which provides an improved method of frequency error estimation.

Firstly, this involves performing a plurality of synchronisation searches, preferably each being performed in the manner described above. This produces a plurality of sets of correlation results $Z_n[i]$, where n is the number of the searches from 1 . . . N where N is the total number of searches. Also, as mentioned above, preferably i=0 . . . 5119 such that two results are taken per chip (with 2560 chips per slot). N might for example be about ten, but this is a matter of design choice.

A measure $E_{rx}[i]$ of the signal energy is determined for each result by taking the modulus squared of Z[i]. The results are then ordered by signal energy and all but the top M results are discarded (at least for the purpose of this calculation). The value M might for example be chosen to return the top 32 candidates. But the chosen value M is a matter of design choice, and may depend on the number of searches N chosen because using more searches gives a greater chance of peaks being returned over all. In fact, good results may be achieved by taking only the top candidate (i.e. M=1) depending on the frequency error, total number of searches and detection limit. However, this limiting case becomes harder as the maximum frequency error to correct increases. This is due to a reduction in correlation peak size, because each chip's vector added to the correlate is rotating.

Figure 5A:
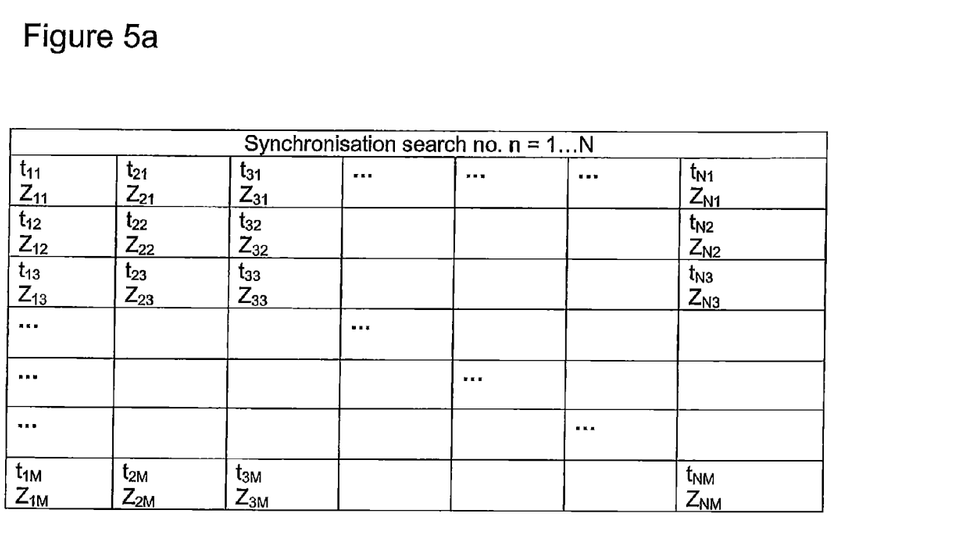
FIG. 5a is a table of correlation results.

Thus an N by M table of results $Z_{nm}[i]$ is produced as shown in FIG. 5a, where n=1 . . . N and m=1 . . . M. Each column from left to right represents the next sequentially performed synchronisation search, such that adjacent columns are performed sequentially in time. Each entry in the table also comprises a measure of the timing offset $t_{nm}$, which simply equals the chip index i of that entry.

In an idealized scenario as illustrated in FIG. 4a, with no noise or interference, then each entry in the top row (m=1) of the table of FIG. 5a would always correspond to the peak 20 at the slot boundary $T_b$. Furthermore, with no frequency error the time offset of each entry would be perfectly aligned in time such that $t_{11}=t_{21}=t_{31}= \ldots =t_{N1}$ Note that there may in fact be extra peaks (not shown), particularly if the P-SCH sequence is split into four partial correlations there then there will be peaks at multiples of 64 chip offsets from the man peak 20. Further, the P-SCH code is hierarchical, so there may be other peaks at other positions.

Figure 4B:
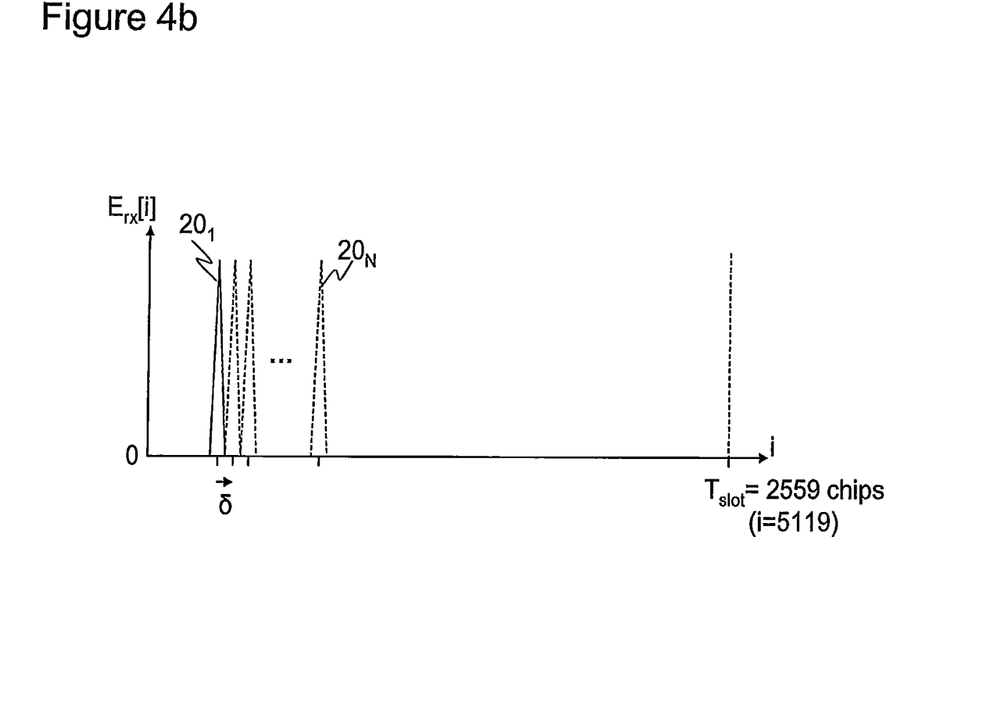
FIG. 4b shows the output of FIG. 4a additionally including a timing drift.
Figure 5B:
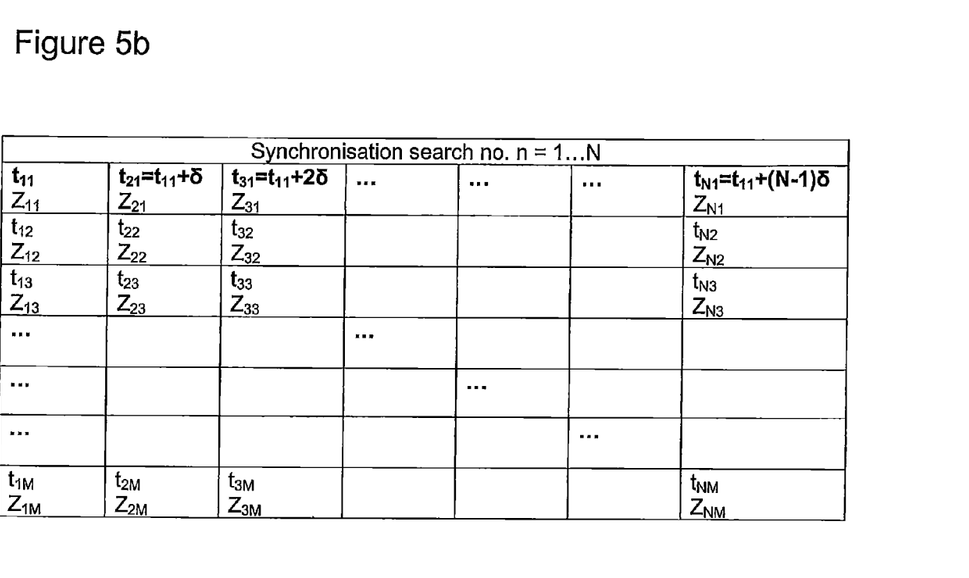
FIG. 5b is a table of correlation results subject to a timing drift.

A semi-idealized scenario is now considered with reference to FIGS. 4b and 5b, where a frequency error is included but where the effects of noise and interference are still ignored. In this case the entries in the top row (m=1) would still each correspond to the peak 20 at the slot boundary, but those entries would be subject to a timing drift δ in each successive search n caused by the frequency difference between the transmitted frequency $f_{tx}$ and the sampling frequency $f_{rx}$. This has the effect that the peak 20, i.e. the slot boundary $T_b$, appears to drift from the point of view of the receiver 4. FIG. 4b illustrates schematically the peaks $20_1 \ldots 20_N$ corresponding to those detected by searches n=1 . . . N respectively (note again that FIG. 4b is not necessarily to scale). The drift δ will be constant from one search to the next assuming that the searches are performed at constant time intervals. So as shown in FIG. 5a, $t_{21}=t_{11}+\delta$, $t_{31}=t_{11}+2\delta$, etc., with the general equation being $t_{n1}=t_{11}+(n-1)\delta$ and the final entry in that row being $t_{N1}=t_{11}+(N-1)\delta$.

Note that because Z[i] is the result of an accumulation over a number of slots, then i can be thought of as a "wrap-around" variable. That is, if the drift is such that i+(n−1)δ>5119 (or whatever the slot length is), then i effectively becomes i−5120.

Figure 4C:
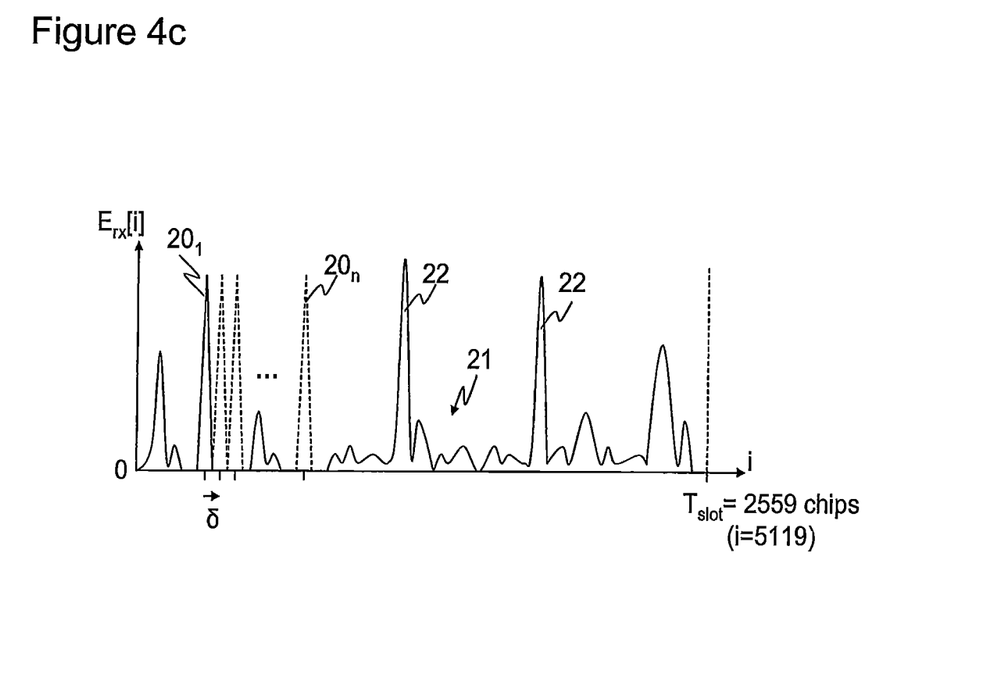
FIG. 4c shows the output of FIG. 4b additionally including noise.

A more realistic situation is now discussed with reference to FIGS. 4c and 5c, in which both a frequency error and noise is considered. The term noise is not intended herein to be limited only to white noise, or thermal noise, but for the purposes of this description can also include interference such as inter-cell interference, intra-cell interference, multipath interference and any other types of distortion. FIG. 4c shows the situation of FIG. 4b with the addition of noise 21. Note that the noise 21 illustrated is highly schematized and no particular form is intended, except only that some noise peaks 22 are shown as being of a similar order of magnitude in height to the peaks 20 corresponding to the slot boundary. The signal-to-noise ratio of the P-SCH is typically very low, such that the noise can be comparable in magnitude to the slot-boundary peaks 20. Thus it will be appreciated that picking the peaks 20 out of this noise 21 is not straightforward.

Figure 5C:
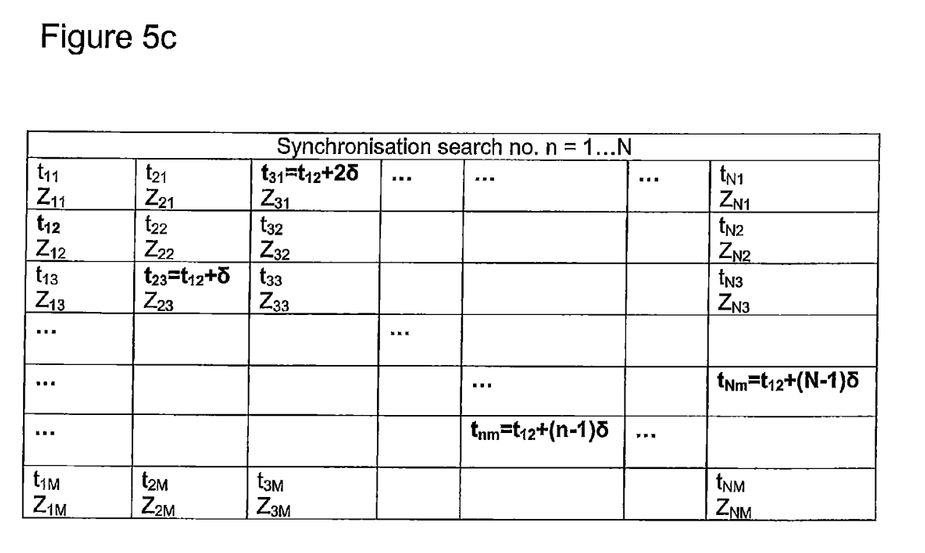
FIG. 5c is a table of correlation results subject to a timing drift and noise.

As shown in FIG. 5c, many or most of the entries in the N×M table will actually be due to the noise 22, and the locations within the table of the actual slot-boundary peaks $20_1 \ldots 20_N$ will not be apparent without further analysis. By way of example, the locations of the slot-boundary peaks $20_1 \ldots 20_N$ in FIG. 5c are at $t_{12}$, $t_{23}=t_{12}+\delta$, $t_{31}=t_{12}+2\delta, \ldots, t_{nm}=t_{12}+(n-1)\delta, \ldots t_{Nm}=t_{12}+(N-1)\delta$. These entries can be thought of as forming a "run" across the table. However, of course δ is not initially known, so the entries $t_{12}$, $t_{23}$, $t_{31}$, etc. initially appear no different from any other arbitrary noise entries. Therefore the locations of the required entries and the path of the run will not be immediately apparent. A method is required for uncovering the run from amongst the unwanted entries in the table. Such a method is now described.

First, a maximum timing drift Δ is specified, which provides a constraint within which to search for the run. The value of Δ will depend on the maximum likely frequency difference between the transmitter clock 6 and receiver clock 8. This will usually depend largely on the error in the receiver clock 6 in the case where a cheaper crystal is used for the oscillator for a lower cost consumer device such as a mobile phone (at least relatively low cost compared to a transmitter such as a base station). A typical value of Δ might be half a chip.

The method then uses Δ to look for the run, i.e. to look for a series of entries corresponding to the cell boundary peak 20. So an entry will only be included in the run on the condition that it is within Δ of an entry from an adjacent search (i.e. adjacent in time in the sequence of searches). Until determined otherwise, each entry in the table may be considered a candidate. Starting at the first candidate in the first column (n=1 and m=1), it is determined whether any other candidate in the second column (n=2) has a timing offset which falls within the maximum time drift Δ of that first candidate. That is to say, it is determined whether $t_{21} \le t_{11}+\Delta$, whether $t_{22} \le t_{11}+\Delta$, whether $t_{23} \le t_{11}+\Delta$ and so on, up to and including determining whether $t_{2M} \le t_{11}+\Delta$.

Then, moving on to the next candidate in the first column (n=1 and m=2), it is determined whether any other candidate in the second column (n=2) has a timing offset which falls within the maximum time drift $\Delta$ of that next candidate. That is, it is determined whether $t_{21} \leq t_{12}+\Delta$, whether $t_{22} \leq t_{12}+\Delta$, whether $t_{23} \leq t_{12}+\Delta$ and so on, up to and including determining whether $t_{2M} \leq t_{12}+\Delta$. This continues for each of the M candidates in the first column (n=1), so for each value m in the first column it is determined whether any candidate in the second column has a timing offset which falls within the maximum time drift $\Delta$ of that $M^{th}$ candidate. That is, it is determined whether $t_{21} \leq t_{1m}+\Delta$, whether $t_{22} \leq t_{1m}+\Delta$, whether $t_{23} \leq t_{1m}+\Delta$ and so on, up to and including determining whether $t_{2M} \leq t_{1m}+\Delta$. A positive determination may be referred to herein as a "hit".

In the example of FIG. 5c, the candidate at n=1 and m=1 is actually an unwanted noise entry, so it is unlikely that any candidates in the second column will fall within the maximum time drift $\Delta$ of that entry. However, the entry at m=2 and n=1 is a genuine slot-boundary result, so one of the candidates in the second column should fall within $\Delta$ of that entry. In this example, this is the candidate at n=2 and m=3.

Note however that the noise entries can appear with literally any timing at all, so there is always a possibility that the above test will detect multiple "hits" if only two adjacent columns are compared, because an unwanted noise entry in the second column may happen by chance to have a timing offset within $\Delta$ of one of the entries in the first column. This is why it is important to look for runs across the table, rather than individual hits.

The method therefore continues as follows. For the first candidate in the second column (n=2 and m=1), it is determined whether any other candidate in the third column (n=3) has a timing offset which falls within the maximum time drift $\Delta$ of that candidate. That is to say, it is determined whether $t_{31} \leq t_{21}+\Delta$, whether $t_{32} \leq t_{21}+\Delta$, whether $t_{33} \leq t_{21}+\Delta$ and so on, up to and including determining whether $t_{3M} \leq t_{21}+\Delta$. Then it is determined whether any candidate in the third column falls within $\Delta$ of the second candidate in the second column, i.e. whether $t_{31} \leq t_{22}+\Delta$, whether $t_{32} \leq t_{22}+\Delta$, whether $t_{33} \leq t_{22}+\Delta$ and so on, up to and including determining whether $t_{3M} \leq t_{22}+\Delta$. This continues for each of the M candidates in the second column, such that for the $m^{th}$ candidate in the second column it is determined whether any candidate in the third column falls within $\Delta$ of that candidate, i.e. whether $t_{31} \leq t_{2m}+\Delta$, whether $t_{32} \leq t_{2m}+\Delta$, whether $t_{33} \leq t_{2m}+\Delta$ and so on, up to and including determining whether $t_{3M} \leq t_{2m}+\Delta$. In the example of FIG. 5c, the next hit is thus found to be at n=3 and m=1.

Any false hits detected in the comparison between the first and second columns will thus most likely be able to be ruled out, because the chance of detecting two false hits in a row is very low. The chance can be diminished even further by continuing to compare the third and fourth columns, fourth and fifth columns, etc., up to and including comparing the $(N-1)^{th}$ column with the $N^{th}$ column, so as to preferably build up a run of hits across the whole width of the table. Note though that a run may contain gaps, and that it may still be possible to use a run containing one or more gaps. In this case a multiple of $\Delta$ is considered from the last good candidate.

The generalized determination by be expressed as: for the $m^{th}$ candidate in the $(n-1)^{th}$ column, determine whether the timing offset $t_{nm}$ of any candidate in the $n^{th}$ column falls within the maximum timing offset $\Delta$ of the timing offset $t_{(n-1)m}$ of that $m^{th}$ candidate in the $(n-1)^{th}$ column.

Note, the run analysis is preferably performed in both the $+\Delta$ and $-\Delta$ directions (left to right and right to left) to check for +ve and −ve frequency offsets. Once the run of N entries has thus been discovered, a comparison between the timing offset of the first and the final entry in the run can be used to estimate the timing drift $\delta$. That is, $\delta = (t_N - t_1)/(N-1)$ where $t_N$ is the timing offset of the $N^{th}$ entry in the run and $t_1$ is the timing offset of the $1^{st}$ entry in the run. Using the $1^{st}$ and $N^{th}$ entries gives the best estimate because they give the largest timing drift $(N-1)\delta$, and thus the least error in the estimate. Other options may be possible, for example by a best-fit analysis.

Once the timing drift $\delta$ has been determined, it is straightforward to determine the frequency offset $f_0$.

An alternative estimate is as follows. The coherent terms detected from the run in the table are added together, i.e. the real parts (Re) of the Z[i] results from the run are summed and the imaginary parts (Im) of the Z[i] results from the run are summed. These real and imaginary sums can then be used to generate a phase offset by arctan (Im/Re), which when multiplied by an appropriate scalar to give the frequency offset. That is:

$$f_0 \propto \arctan\left(\frac{\sum_{run} \mathrm{Im}(Z[i])}{\sum_{run} \mathrm{Re}(Z[i])}\right)$$

This latter estimate is preferred because the accuracy of the former is determined by the time between searches, as well as the number of searches. Longer time between searches and/or more searches improves accuracy but the drawback is that this takes longer.

The latter estimate also has an additional advantage, because the magnitude of the coherent sum can be thresholded to reduce the likelihood of false alarms. I.e. a run will be detected as a false alarm if:

$$\left(\sum_{run} \mathrm{Re}(Z[i])\right)^2 + \left(\sum_{run} \mathrm{Im}(Z[i])\right)^2 < \mathrm{threshold}$$

In embodiments, the former estimate may be used to check the results of the latter. Using both together provides a very robust technique in this field. For example, if the two estimates agree within some predetermined tolerance, then it can be established that the method is not locking onto an adjacent raster. If the carrier frequency is one raster (200 kHz) offset away from a valid signal then the algorithm will still indicate a detection but the frequency will be wrong due to the phasor wrapping round the unit circle a few times.

The estimate of the frequency offset can then be used in an automatic frequency control (AFC) operation to correct for the frequency difference, by applying a change in voltage to the crystal of the voltage controlled clock to give a change in frequency as will be familiar to a person skilled in the art.

The method is preferably implemented by the receiver 4 in software, by means of a frequency offset estimation function (not shown) comprising a portion of code stored in the receiver's memory and executed on the receiver's processor.

For completeness, note of course that the frequency offset estimation function implemented by the receiver 4 is unlikely to actually produce a table in the graphical sense of the word. Rather, it uses an organized array which may be considered as a table for easier understanding.

It will be appreciated that the above embodiments are described only by way of example. Other uses and variations may be apparent to the person skilled in the art. The scope of the invention is not limited by the described embodiments, but only be the following claims.

What is claimed is:

1. A method of estimating a frequency offset, the method comprising:
   receiving a wireless signal timed according to a first frequency;
   generating a local signal timed according to a second frequency;
   performing a first synchronization search, the first synchronization search comprising obtaining a set of correlation results indicative of a correlation between the wireless signal and the local signal at a first timing offset of the wireless signal relative to the local signal;
   performing at least one subsequent synchronization search, the at least one subsequent synchronization search comprising obtaining a subsequent set of correlation results indicative of a correlation between the wireless signal and the local signal at least one subsequent timing offset different to said first timing offset of the wireless signal relative to the local signal, whereby the first synchronization search and the at least one subsequent synchronization search constitute a plurality of synchronization searches;
   finding a series of results, with a result from each of a plurality of said synchronization searches, for which the difference in timing offset between results from adjacent searches in the series is within a maximum specified value; and
   determining from said series a frequency offset between the first and second frequencies.

2. The method of claim 1, comprising:
   for each synchronization search, ordering the respective correlation results in order of a corresponding received signal energy.

3. The method of claim 2, wherein said step of finding of said series is performed using only a top portion of the correlation results having the greatest received signal energy from each synchronization search.

4. The method of claim 1, comprising using said estimation to correct for the frequency offset.

5. The method of claim 1, wherein the step of determining the frequency offset comprises determining the frequency offset from a difference in timing offsets between at least two of the correlation results from different searches in said series.

6. The method of claim 1, wherein the step of determining the frequency offset comprises determining a phase from sums of real and imaginary parts of the correlation results in said series.

7. The method of claim 1, comprising wherein the step of determining the frequency offset is conditional on a magnitude of a sum of real and imaginary parts of the correlation results in said series being above a predetermined threshold.

8. The method of claim 1, wherein the step of receiving the wireless signal comprises receiving a synchronization channel on which is broadcast a synchronization code, and the step of generating the local signal comprises generating a local version of the synchronization code.

9. The method of claim 8, wherein the synchronization channel is a primary synchronization channel of a W-CDMA cellular communications system.

10. A wireless receiver, comprising:
    reception means arranged to receive a wireless signal timed according to a first frequency;
    generation means arranged to generate a local signal timed according to a second frequency;
    correlation means arranged to perform a plurality of synchronization searches, by performing a first synchronization search, the first synchronization search comprising obtaining a set of correlation results indicative of a correlation between the wireless signal and the local signal at a first timing offset of the wireless signal relative to the local signal;
    performing at least one subsequent synchronization search, the at least one subsequent synchronization search comprising obtaining a subsequent set of correlation results indicative of a correlation between the wireless signal and the local signal at least one subsequent timing offset different to said first timing offset of the wireless signal relative to the local signal, whereby the first synchronization search and the at least one subsequent synchronization search constitute a plurality of synchronization searches; and
    frequency offset estimation means arranged to find a series of results, with a result from each of a plurality of said synchronization searches, for which the difference in timing offset between results from adjacent searches in the series is within a maximum specified value, and to estimate from said series a frequency offset between the first and second frequencies.

11. The receiver of claim 10, wherein the frequency offset estimation means is arranged, for each synchronization search, to order the respective correlation results in order of a corresponding received signal energy.

12. The receiver of claim 11, wherein the frequency offset estimation means is arranged to find said series using only a top portion of the correlation results having the greatest received signal energy from each synchronization search.

13. The receiver of claim 10, wherein the frequency offset estimation means is arranged to determine the frequency offset from a difference in timing offsets between at least two of the correlation results from different searches in said series.

14. The receiver of claim 10, wherein the frequency offset estimation means is arranged to determine the frequency offset from a phase determined from sums of real and imaginary parts of the correlation results in said series.

15. The receiver of claim 10, wherein the frequency offset estimation means is arranged to determining the frequency offset on the condition that a magnitude of a sum of real and imaginary parts of the correlation results in said series is above a predetermined threshold.

16. The receiver of claim 10, comprising automatic frequency correction means for using said estimation to correct for the frequency offset.

17. The receiver of claim 10, wherein the reception means is arranged to receive a synchronization channel in said wireless signal on which is broadcast a synchronization code, and the local signal comprises a local version of the synchronization code.

18. The receiver of claim 17, wherein the synchronization channel is a primary synchronization channel of a W-CDMA cellular communications system.

19. A computer program product for estimating frequency offset between a received wireless signal timed according to a first frequency and a generated local signal timed according to a second frequency, the program comprising code stored on a non-transitory computer readable medium which when executed by a processor is configured to perform the steps of:
    performing a first synchronization search, the first synchronization search comprising obtaining a set of correlation results indicative of a correlation between the wireless signal and the local signal at a first timing offset of the wireless signal relative to the local signal; and performing at least one subsequent synchronization search, the at least one subsequent synchronization search comprising obtaining a subsequent set of correlation results indicative of a correlation between the wireless signal and the local signal at least one subsequent timing offset different to said first timing offset of the wireless signal relative to the local signal, whereby the first synchronization search and the at least one subsequent synchronization search constitute a plurality of synchronization searches;

finding a series of results, with a result from each of a plurality of said synchronization searches, for which the difference in timing offset between results from adjacent searches in the series is within a maximum specified value; and determining the frequency offset from said series.

20. A wireless cellular communication system comprising:

a base station arranged to transmit a wireless signal timed according to a first frequency, and a mobile terminal comprising:
  reception means arranged to receive said wireless signal;
  generation means arranged to generate a local signal timed according to a second frequency;
  correlation means arranged to perform a plurality of synchronization searches, by:
    performing a first synchronization search, the first synchronization search comprising obtaining a set of correlation results indicative of a correlation between the wireless signal and the local signal at a first timing offset of the wireless signal relative to the local signal; and
    performing at least one subsequent synchronization search, the at least one subsequent synchronization search comprising obtaining a subsequent set of correlation results indicative of a correlation between the wireless signal and the local signal at least one subsequent timing offset different to said first timing offset of the wireless signal relative to the local signal, whereby the first synchronization search and the at least one subsequent synchronization search constitute a plurality of synchronization searches; and
  frequency offset estimation means arranged to find a series of results, with a result from each of a plurality of said synchronization searches, for which the difference in timing offset between results from adjacent searches in the series is within a maximum specified value, and to estimate from said series a frequency offset between the first and second frequencies.

* * * * *